United States Patent
Dürrstein et al.

(10) Patent No.: US 10,952,831 B1
(45) Date of Patent: Mar. 23, 2021

(54) SUCTION HANDPIECE FOR A DENTAL TREATMENT UNIT

(71) Applicant: Dürr Dental SE, Bietigheim-Bissingen (DE)

(72) Inventors: Martin Dürrstein, Bietigheim-Bissingen (DE); Andreas Hägele, Weinstadt (DE)

(73) Assignee: Dürr Dental SE, Bietigheim-Bissingen (DE)

( * ) Notice: Subject to any disclaimer, the term of this patent is extended or adjusted under 35 U.S.C. 154(b) by 0 days.

(21) Appl. No.: 16/921,637

(22) Filed: Jul. 6, 2020

(30) Foreign Application Priority Data

May 25, 2020 (EP) ..................................... 20176359

(51) Int. Cl.
  *A61C 17/08* (2006.01)
  *A61C 17/06* (2006.01)

(52) U.S. Cl.
  CPC ............ *A61C 17/08* (2019.05); *A61C 17/092* (2019.05)

(58) Field of Classification Search
  CPC ............................................... A61C 17/04–10
  USPC ...................................................... 433/91–92
  See application file for complete search history.

(56) References Cited

U.S. PATENT DOCUMENTS

| | | | | |
|---|---|---|---|---|
| 1,868,653 A | * | 7/1932 | Abraham | A61C 17/08 433/29 |
| 3,735,491 A | * | 5/1973 | Pabalan, Jr. | A61B 1/24 433/93 |
| 4,417,874 A | * | 11/1983 | Andersson | A61C 17/08 433/96 |
| 4,967,320 A | * | 10/1990 | Paschal | A61C 19/00 362/96 |
| 7,785,105 B2 | * | 8/2010 | Anderson | A61C 17/08 433/140 |

(Continued)

FOREIGN PATENT DOCUMENTS

| | | |
|---|---|---|
| AT | 10 972 U1 | 2/2010 |
| CN | 110251060 A | 9/2019 |

(Continued)

OTHER PUBLICATIONS

Search Report dated Oct. 30, 2020 in corresponding European Application No. 20176359 and the machine translation of the search opinion.

*Primary Examiner* — Matthew M Nelson
(74) *Attorney, Agent, or Firm* — Joseph V. Saphia; Haug Partners LLP

(57) ABSTRACT

A suction handpiece for a dental treatment unit has a negative pressure connection which can be connected with a negative pressure source of the treatment unit. A saliva connection of the suction unit can be connected with a saliva suction cannula and an atomized spray connection that can be connected with an atomized spray suction cannula. A branched flow path connects the negative pressure connection with both the saliva connection and the atomized spray connection and includes a branching section on which a negative pressure channel ending on the negative pressure connection divides into a saliva channel ending on the saliva connection and an atomized spray channel ending on the atomized spray connection. The atomized spray channel at its narrowest point has a first cross sectional area which is at least twice as large as a second cross sectional area at the narrowest point of the saliva channel.

24 Claims, 2 Drawing Sheets

(56) References Cited

U.S. PATENT DOCUMENTS

| | | | | |
|---|---|---|---|---|
| 8,585,403 | B2* | 11/2013 | Ames | A61C 17/08 |
| | | | | 433/93 |
| 9,636,194 | B2* | 5/2017 | Fatiny | A61B 13/00 |
| 2005/0004520 | A1* | 1/2005 | Lemoine | A61C 17/08 |
| | | | | 604/118 |
| 2006/0093990 | A1* | 5/2006 | Stone | A61C 17/065 |
| | | | | 433/92 |
| 2012/0237894 | A1* | 9/2012 | Maycher | A61C 17/08 |
| | | | | 433/95 |
| 2014/0272783 | A1* | 9/2014 | Harris | A61C 17/04 |
| | | | | 433/95 |
| 2018/0125622 | A1* | 5/2018 | Almoumen | A61C 1/0023 |

FOREIGN PATENT DOCUMENTS

| | | | |
|---|---|---|---|
| DE | 86 12 671 U1 | 7/1986 | |
| DE | 8612671 U1 * | 7/1986 | A61C 17/08 |
| DE | 201 03 524 U1 | 9/2001 | |
| DE | 20103524 U1 * | 9/2001 | A61C 17/08 |
| EP | 2 842 516 B1 | 1/2018 | |
| EP | 3 360 508 B1 | 10/2019 | |
| FR | 2 952 805 B1 | 7/2012 | |
| FR | 3 044 542 A1 | 12/2015 | |
| JP | 2004033474 A | 2/2004 | |
| WO | WO 2011/120668 A1 | 10/2011 | |
| WO | WO-2011120668 A1 * | 10/2011 | A61C 17/08 |

\* cited by examiner

SUCTION HANDPIECE FOR A DENTAL TREATMENT UNIT

CROSS-REFERENCE TO RELATED APPLICATIONS

This application claims benefit of earlier European patent application 20176359.6 which was filed on May 25, 2020. The entire disclosure of this earlier patent application is incorporated herein by reference.

BACKGROUND OF THE INVENTION

1. Field of the Invention

The invention relates to a suction handpiece for a dental treatment unit which can be connected with cannulas as well as a negative pressure source located in or allocated to the treatment unit.

2. Description of the State of the Art

Certain activities such as the preparation of teeth, the removal of fillings, crowns and bridges or the removal of plaque require the use of instruments which rotate with high speed. In order to avoid damages in the pulp dentin zone, water is supplied during treatment for the purpose of local cooling. In this process, atomized spray, also referred to as aerosols, is created. The atomized spray leaving the patient's mouth contains droplets which may include cooling water, saliva and blood. A high risk of infection emanates from said mixture.

Said atomized spray leaving the patient's mouth can, if no countermeasures are taken, still be detected at a distance of several meters, and settle on surfaces in the treatment room. Thus, the individuals present in the treatment room apart from the patient, in particular the attending dentist and his or her support staff, inhale the atomized spray and might become infected, as the case may be.

The most efficient countermeasure against distribution of the atomized spray is to suck it off by means of a cannula while the atomized spray is still in the oral cavity of the patient.

In practice, one distinguishes between a high volume suction, as it is mainly used in Europe, and a medium volume suction which has established itself outside Europe. In the case of the high volume suction, volume flows between 250 and 350 l/min are achieved by the interaction of a negative pressure generator, tubes and cannulas; the suction cannulas typically have an inner diameter of approximately 12 mm. In the case of the medium volume suction, the volume flow is typically between approximately 100 and 250 l/min, with the cannulas having an inner diameter of approximately 9 mm.

But during dental treatment, as the case may be, not only the atomized spray but also liquids such as blood and saliva with particles contained therein must be sucked off. For this purpose, a smaller cannula is connected to the negative pressure source via a separate tube. This smaller cannula, which is usually called saliva drain or saliva ejector, has a clearly smaller cross-section with an inner diameter between approximately 3 and 5 mm, and is provided with a small protective cap at the end into which several openings with a clear width of approximately 0.4 to 0.7 mm are integrated. The protective cap prevents that larger particles are sucked in which might cause obstruction of the saliva ejector.

Due to its small cross-section, the saliva ejector is not suitable for sucking off the atomized spray. The volume flow of air, when no liquid is sucked in, is only approximately 80 to 120 l/min. Since the volume flow is generally impeded by soft tissue on which the protective cap rests, the atomized spray cannot be efficiently sucked off by the saliva ejector alone.

Depending on the country, dental treatment, including suction, is carried out in different ways. In German speaking countries, suction of liquids and atomized spray is usually assisted by the dental assistant so that the dentist can entirely concentrate on the actual treatment. In most other countries, such as, for example, in France, however, the dentist works alone. But without assistance by a dental assistant, it is difficult to insert the saliva ejector and in addition the cannula for suction of the atomized spray into the patient's oral cavity, and to carry out actual treatment at the same time. As a consequence, often only suction of the saliva is performed but the atomized spray can leave the patient's oral cavity largely unhindered.

From WO 2011/120668 A1, a suction device is known where two saliva ejectors come off from one handpiece. One of the two saliva ejectors has a hook-shaped bend by means of which it can be fitted to the corner of the mouth of the patient to be treated so that it need not be held by hand. The end of said saliva ejector lies in the deepest accessible portion of the oral cavity parallel to the lower row of teeth of the corner of the mouth, and sucks off excess water and saliva from there. The other saliva ejector, which is deformable, is oriented to a location where a selective suction is requested, and at the same time keeps the tongue away.

SUMMARY OF THE INVENTION

It is the objective of the invention to specify a suction handpiece for a dental treatment unit which permits ergonomic working and a high protection against infections.

This objective is achieved according to the invention by a suction handpiece for a dental treatment unit, which has a negative pressure connection adapted to be connected with a negative pressure source of the treatment unit. Moreover, the suction handpiece has a saliva connection adapted to be connected with a saliva suction cannula, and an atomized spray connection adapted to be connected with an atomized spray suction cannula. The suction handpiece has a branched flow path which connects the negative pressure connection with both the saliva connection and the atomized spray connection. The flow path contains a branching section on which a negative pressure channel ending on the negative pressure connection divides into a saliva channel ending on the saliva connection, and an atomized spray channel ending on the atomized spray connection. The atomized spray channel has a first cross sectional area A1 at its narrowest point which is at least twice as large as a second cross sectional area A2 at the narrowest point of the saliva channel.

Hence, a saliva suction cannula and an atomized spray suction cannula can be simultaneously connected with the suction handpiece according to the invention, and operated in parallel. Therefore, the attending dentist or the dental assistant no longer need to operate two separate handpieces, and instead, can manage saliva suction and atomized spray suction with one hand. When the saliva suction cannula is angled in a U-shaped manner, the handpiece can also be fitted to the corner of the mouth of the patient so that also a dentist attending alone has both hands free for actual treatment. When the saliva suction cannula is bendable and the larger atomized spray suction cannula is also bendable, twistable or adjustable in any other way, both suction cannulas can be easily placed at desired locations. An arrangement of the two suction cannulas is also considered where the saliva suction cannula is in the oral cavity of the patient and the atomized spray suction cannula is outside the oral cavity of the patient. Such an arrangement is advantageous in particular with highly constricted treatment space such as that in the oral cavity, because it is often difficult to place dental instruments in the desired manner on the treatment site within the oral cavity of the patient in addition to two suction cannulas.

The invention is based on the surprising discovery that for an efficient suction of liquids, only a relative low volume flow is required. As a result, it is possible to suck off efficiently not only liquids but also atomized spray via only one single negative pressure tube installed on the treatment unit. The handpiece according to the invention takes into account the very different requirements for the necessary volume flows by the different cross-sections in the saliva channels and atomized spray channels. In this way, the volume flows of approximately 80 to 120 l/min and the clearly larger volume flow of 200 to 350 l/min required for the saliva ejector can be achieved via only one tube connection to the pressure source of the treatment unit.

Preferably, the ratio $m=A1/A2$ between the cross sectional areas in the atomized spray channel and/or the saliva channel is between 3 and 100, and more preferably, between 5 and 50. It has turned out that in the case of these ratios of the cross sectional areas a particularly favorable distribution of the suction capacity available can be achieved for the functions of saliva suction and atomized spray suction.

Furthermore, it is preferred when the cross sectional area A1 has a value between 25 mm$^2$ and 120 mm$^2$ and the cross sectional area A2 has a value between 1.7 mm$^2$ and 7 mm$^2$. In order to be able to use the current atomized spray suction cannula and saliva suction cannula unvaried with the handpiece according to the invention, it is suggested to adapt the cross-sections A1 and A2 in the atomized spray channel and/or in the saliva channel to the cross-sections of the cannulas customary in the market. However, deviations for reasons to be explained still below may be appropriate. This results in preferred values for the cross sectional area A1 between 35 mm$^2$ and 100 mm$^2$ and for the cross sectional area A2 between 2.5 mm$^2$ and 8 mm$^2$.

In order to obtain flow paths with low resistance, it is convenient when the cross sectional areas of the channels are circular. However, cross sectional areas with different shapes may be used. For example, the saliva suction cannulas are often provided with a wire in order to render them plastically deformable. In that case, the shape of the cross sectional areas of the cannulas often deviates from the circular shape.

In a preferred embodiment, the negative pressure channel and the atomized spray channel are each extending in a straight line and have longitudinal axes aligned with one another. As a consequence, the air sucked in at the atomized spray channel with the atomized spray contained in it is not diverted on its way through the handpiece and across the branching section but has a straight flow pattern. As a result, the resistance to flow is reduced and the efficiency of the atomized spray suction is increased.

In that case, the saliva channel can have an inclined portion with a longitudinal axis, which is pointing to the branching section, wherein the longitudinal axis has an angle to the longitudinal axis of the negative pressure channel which is between 10° and 45° and preferably between 20° and 30°. Said relatively small angle at which the saliva channel runs into the negative pressure channel reduces the resistance to flow and thus contributes to an efficient suction of saliva and other liquids.

Here, when the saliva channel has another section with a longitudinal axis which extends parallel to the longitudinal axis of the atomized spray channel, the atomized spray suction cannula and the saliva suction cannula can be connected in parallel to the corresponding connections of the suction handpiece so that the handpiece can be used more easily by the dental assistant or the attending dentist.

In a preferred embodiment, the atomized spray channel has a tapering section directly adjacent to the branching section in which tapering section the cross sectional area of the atomized spray channel is tapered. The tapering is preferably 20% to 35% relative to a section of the atomized spray channel opposite to the branching section. As a result of said tapering, in the area of the branching section a pressure difference occurs compared with the position where the atomized spray suction cannula is inserted into or otherwise fitted to the handpiece. Said differential pressure has a positive effect on the suction effect at the saliva channel.

Furthermore, it is advantageous to have the cross sectional area, of the saliva channel, that is continuously or stepwise tapered towards the saliva connection. Said tapering causes larger particles, which penetrate the openings of the protective caps usually disposed at the end of the saliva suction cannulas, to accumulate in the tapering section so that they do not result in an obstruction of the subsequent flow path. When cleaning the suction handpiece, the particles can be easily pushed out and removed from the tapering section by means of a small instrument.

The subject matter of the invention is moreover a suction device with a suction handpiece described above, a saliva suction cannula connected with the saliva connection, and an atomized spray suction cannula connected with the atomized spray connection.

Preferably, the saliva suction cannula and the atomized spray suction cannula are detachably connected with the handpiece. This is advantageous in particular when the cannulas are disposable products. But it is also possible that at least one of the cannulas is integrally formed with the handpiece and thus cannot be detached from the handpiece in a non-destructive manner. After treatment the entire suction device can then be cleaned and disinfected without it being necessary to disassemble it before.

In one embodiment, the saliva suction cannula is plastically bendable. The atomized spray suction cannula is provided with at least one pivotal joint or ball-and-socket joint. In this way, the suction ends of the suction cannulas can be placed at the desired locations.

The saliva suction cannula and the atomized spray suction cannula can be formed in such a manner that during treatment a suction end of the saliva suction cannula can be placed in the oral cavity of the patient and one suction end of the atomized spray suction cannula can be placed outside the oral cavity of the patient. As it has already been explained above, this can be advantageous, when for reasons of space, one cannot place both suction ends in the oral cavity of the patient.

The atomized spray suction cannula can have a suction head fitted in a replaceable manner. Thus, suction heads of different shapes can be fitted on the main cannula body which are adapted to the special requirements of treatment.

When air abrasive particle apparatuses for dental cleaning are used, for example, suction heads with large collecting hoppers can be used.

The saliva suction cannula can be provided at its end with a protective cap known per se which has several openings for sucking in liquids. The atomized spray suction cannula on the contrary is preferably open at its end in order not to create an additional resistance to flow.

In one embodiment, the atomized spray suction cannula passes into a collecting hopper at its end which, due to its dimensions, cannot be placed in the oral cavity of a patient. The collecting hopper can have a cross sectional area which is larger than 15 cm$^2$.

In accordance with another aspect of the invention, a suction device for a dental treatment unit includes a saliva suction cannula, an atomized spray suction cannula and a suction handpiece with a negative pressure connection which is adapted to be connected with a negative pressure source of the treatment unit. Furthermore, the suction handpiece has a saliva connection, which is connected with the saliva suction cannula, and an atomized spray connection which is connected with the atomized spray suction cannula. The suction handpiece has a branched flow path which connects the negative pressure connection with both the saliva connection and the atomized spray connection. The flow path contains a branching section where a negative pressure channel ending on the negative pressure connection splits into a saliva channel ending on the saliva connection and into an atomized spray channel ending on the atomized spray connection. The saliva suction cannula includes a protective cap at its end, which has several openings for sucking in liquids, whereas the atomized spray suction cannula is open at its end.

Here, the atomized spray suction cannula at its end can pass into a collecting hopper which, due to its dimensions, cannot be placed in the oral cavity of a patient. Preferably, the collecting hopper has a cross sectional area which is larger than 15 cm$^2$.

Insofar as the terms connections between flow paths, connections and/or channels are used, this always means fluidic connections.

BRIEF DESCRIPTION OF THE DRAWINGS

Embodiments of the invention are explained in detail below by means of the drawings which show.

DESCRIPTION OF PREFERRED EMBODIMENTS

Figure 1:
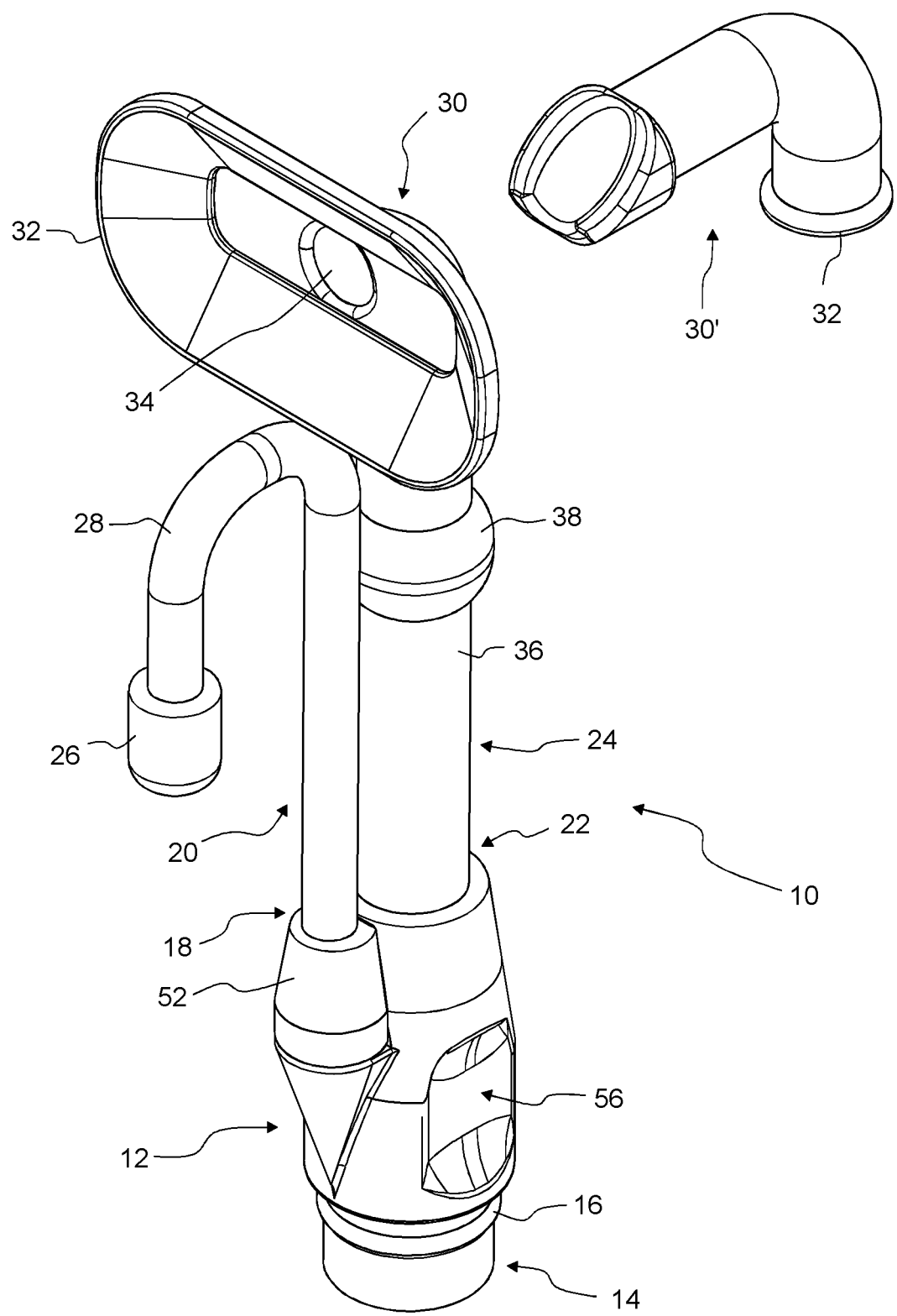
FIG. 1 a perspective representation of a suction device according to the invention with a suction handpiece and two suction cannulas fitted to the same.

FIG. 1 shows in a perspective representation an embodiment of a suction device according to the invention designated in total with 10.

The suction device 10 includes a suction handpiece 12 which has a negative pressure connection 14 on its underside which can be connected via a pressure tube with a negative pressure source of a dental treatment unit ("dentist's chair"). Here, the negative pressure source can be disposed remote from the treatment unit and provide several treatment units with negative pressure at the same time as this is known per se. In order to guarantee a tight connection with the pressure tube, the negative pressure connection 14 includes a sealing ring 16.

On the side facing upwardly in FIG. 1, the suction handpiece 12 includes two further connections, namely a saliva connection 18 on which a saliva suction cannula 20 is detachably fitted, and an atomized spray connection 22 on which an atomized spray cannula 24 is detachably fitted.

The saliva suction cannula 20 includes a design known per se and is shown in FIG. 1 with a U-shaped curvature so that the saliva suction cannula 20 can be fitted at the corner of the mouth or on the lower lip of the patient. The saliva suction cannula 20 has a tube section 28 into which a wire is integrated. Thereby, the tube section 28 can also be transferred to another shape than shown in FIG. 1. At its end, the tube section 28 has a protective cap 26 into which several openings (not shown) are included through which saliva, water, blood and other liquids can be sucked in.

The atomized spray cannula 24 has a clearly larger inner diameter and is provided with a suction head 30 which is fitted in a replaceable manner. In the embodiment shown, the suction head 30 includes a collecting hopper 32, which surrounds a suction port 34 of the atomized spray cannula 24, through which atomized spray can enter unhindered. The dimensions of the collecting hopper 30 are selected here such that the collecting hopper 32 can be introduced into the oral cavity of a patient together with a suction end of the saliva suction cannula 20. If the space in the oral cavity of the patient is not sufficient for the suction head 30 during treatment, the suction head 30 can also be placed entirely outside the oral cavity of the patient. Due to the larger distance from the treatment site, it can be appropriate to use a collecting hopper 32 with a larger hopper area, for example, between approximately 15 cm$^2$ und 100 cm$^2$ in order to be able to collect and suck off as much atomized spray as possible.

The suction head 30 is fastened to a tubular main cannula body 36 via an exchange coupling which is covered in FIG. 1 by the collecting hopper 32. The exchange coupling can, for example, include a plug connection or a screw connection. In this manner, the suction head 30 can be easily replaced by a suction head of different shape and optimally adapted to the specific treatment situation as such suction head is shown in FIG. 1 to the right and designated with 30'.

The main cannula body 30 includes two portions which are connected with each other via a ball-and-socket joint 38. In this manner, the suction head 30 fixed to the upper portion can be oriented in different directions.

Figures 2, 3:
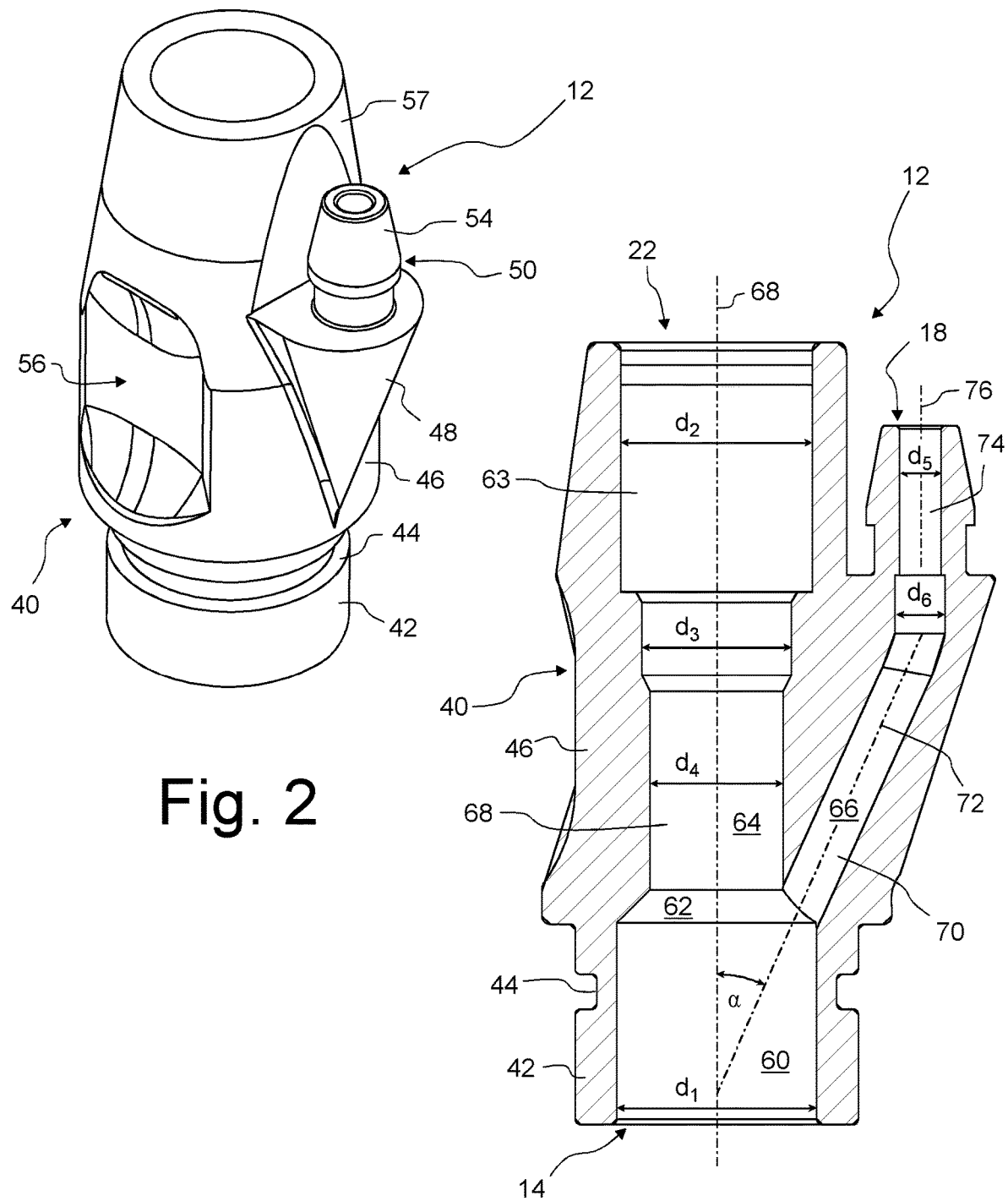
FIG. 2 an enlarged perspective representation of the suction handpiece shown in FIG. 1.
FIG. 3 a longitudinal section of the suction handpiece shown in FIG. 2.

FIG. 2 shows the suction handpiece 12 in an enlarged representation without the cannulas 20, 24 connected to it. The suction handpiece 12 has an almost cylindrical main body 40 with a cylindrical base portion 42, which forms the negative pressure connection 14, and is provided with a circumferential groove 44 into which the sealing ring 16 shown in FIG. 1 is inserted. The connection with the pressure tube is established by sliding the free tube end over the base portion 42 and the sealing ring 16 integrated in the same.

The base portion 42 is followed by a middle portion 46 which has a larger diameter than the base portion 42. A shoulder 48 is molded to one side of the middle portion 46 and the shoulder 48 carries a mushroom-shaped plug-type attachment 50 which forms the saliva connection 18. Whereas the main body 40 and the shoulder 48 can be realized integrally as an injection molded part, the plug-type attachment 50 is preferably made of an elastomer. A connecting piece 52 shown in FIG. 1 of the saliva suction cannula 20 is pushed onto the plug-type attachment 50 prior to start of the operation, wherein the through-opening of the connecting piece has a shape which is complementary to the surface of the plug-type attachment 50. As a result, the connecting piece 52 is engaged during pushing onto the plug-type attachment 50, and due to the material combination at the same time establishes a tight connection between the suction handpiece 12 and the saliva suction cannula 20.

At the level of the shoulder 48, three recessed grips 56 are distributed over the remaining outer surface of the middle portion 46 in order to permit safe guidance of the handpiece 12 by an operator. The middle portion 46 is followed upwards by an end portion 57, the outer surface of which slightly tapers conically, and which forms the atomized spray connection 22.

In the following, reference is made to FIG. 3, which shows the suction handpiece 12 in an axial section so that the flow paths in the suction handpiece 12 can be seen. The section of the flow path adjacent to the negative pressure connection 14 is designated as negative pressure channel 60 in the following. Like all other channels still to be discussed, the negative pressure channel 60 has a circular cross-section in this embodiment. The diameter $d_1$ of the negative pressure channel 60, which does not change over the length of the negative pressure channel 60, is adapted to the inner diameter of the pressure tube, and is approximately 12 mm in the embodiment shown.

In a branching section 62, the negative pressure channel 60 is divided into an atomized spray channel 64 leading to the atomized spray connection 18 and a saliva channel 66 leading to the saliva connection 18. The longitudinal axis 68 of the atomized spray channel 64 is aligned with the longitudinal axis of the negative pressure channel 60 so that a straight-line flow pattern and thus a flow pattern with low resistance is obtained for suction of the atomized spray which requires a high volume flow.

The atomized spray channel 64 is split into three sections with different diameters. An upper section 63 adjacent to the atomized spray connection 22 has a diameter of $d_2$ which is sized such that the main cannula body 36 of the atomized spray suction cannula 24 can be introduced into it. In the embodiment shown, $d_2$=12 mm.

The adjacent section of the atomized spray channel 64 has a diameter of $d_3$ which corresponds to the inner diameter of the channel in the main cannula body 36. In the embodiment shown, $d_3$=9 mm.

Between this section and the branching section 62 there is a tapering section 68 the diameter $d_4$ of which is reduced compared with the diameter $d_3$. In the embodiment shown, $d_4$=8 mm. In the area of the branching section 42, the diameter $d_4$ continuously widens up to the diameter $d_1$ of the negative pressure channel 60. Similarly to a Venturi nozzle, a pressure drop occurs at the transition between the tapering section 68 and the branching section 62 due to the increased flow rate in the tapering section 68 which pressure drop improves the suction effect in the saliva channel 66.

In the embodiment shown, the saliva channel 66 is divided into two sections. In an inclined portion 70 adjacent to the branching section 62, the longitudinal axis 72 is disposed at an angle α to the common longitudinal axis of the negative pressure channel 60 and the atomized spray channel 64 wherein a in the embodiment shown is approximately 25°.

The saliva channel 66 bends at the opposite end, and passes into another section 74, the longitudinal axis 76 of which extends in parallel to the longitudinal axis 68 of the atomized spray channel 64. In the further section 74, the diameter $d_5$ of the saliva channel 66 is reduced compared with the diameter $d_6$ in the remaining saliva channel 66. In the embodiment shown $d_5$=2.5 mm and $d_6$=3 mm. In this way, particles, which could penetrate the protective cap 26, preferably get caught in the second section 74, and do not get in the pressure tube or in the pressure source. When cleaning the suction handpiece 12, the particles can be pushed downwards by means of an elongate object in order to unblock the flow path again.

When using the suction handpiece 12, the latter is connected to the pressure tube by means of the negative pressure connection 14 in order to establish a connection with the pressure source of the treatment unit. Furthermore, the atomized spray suction cannula 24 and the saliva suction cannula 20 are put on the corresponding connections 22 and/or 18. Depending on the design of the suction head 30, the latter can either be placed in such a manner that it is located together with the suction end of the saliva suction cannula 20 in the oral cavity of the patient or outside of the same.

At the narrowest point of the flow path, namely in the tapering section 68, the cross sectional area A1 of the atomized spray channel 64 is approximately 25 mm². The cross sectional area A2 of the saliva channel 66 is approximately 7.8 mm² at the narrowest point (another section 74 with the diameter $d_5$). Thus, the cross sectional area A1 of the atomized spray channel 64 is three times the size of the cross sectional area of the saliva channel 66. As a result, also the volume flow in the atomized spray channel 64 is in rough approximation three times the size as in the saliva channel 66. This takes into account that for an efficient saliva suction only a relatively small volume flow of less than 100 l/min is required. But for an efficient suction of the atomized spray, however, a volume flow is required which should be in the order of magnitude of 300 l/min.

Since the actually achievable volume flow depends on the negative pressure applied at the negative pressure connection 14 as well as the flow paths in the handpiece 12, in the cannulas 20, 24, much larger ratios A1/A2 of up to 100 may be required in order to guarantee sufficient volume flow for both the saliva suction and the atomized spray suction. On the other hand, in the case of particularly efficient negative pressure pumps, a smaller ratio A1/A2 may be sufficient which, however, should not fall below the value of 2.

In the case of an alternative not shown, the suction handpiece 12 includes a slide switch by means of which the fluidic connection to the negative pressure connection 14 can be interrupted wholly or in part. In this manner, a dental assistant or the attending dentist can interrupt or reduce the suction with immediate effect without it being necessary to operate any control elements on the treatment unit.

Instead of the atomized spray suction cannula 24 relatively complex in design and therefore provided for multiple use, also cannulas of a more simple design can be used, which are only provided for one-time use, and therefore need not be cleaned. Such cannulas known per se are of similar design as bendable straws so that their suction ends can likewise be placed at different locations within or outside the oral cavity of the patient.

The invention claimed is:

1. A suction handpiece for a dental treatment unit, wherein the suction handpiece comprises a negative pressure connection that is configured to be connected with a negative pressure source of the treatment unit, a saliva connection which is configured to be connected with a saliva suction cannula, an atomized spray connection which is configured to be connected with an atomized spray suction cannula, and a branched flow path which connects the negative pressure connection with both the saliva connection and the atomized spray connection, wherein the flow path includes a branching section in which a negative pressure channel ending on the negative pressure connection divides into a saliva channel ending on the saliva connection and an atomized spray channel ending on the atomized spray connection, and wherein the atomized spray channel at its narrowest point has a first cross sectional area A1 which is at least twice as large as a second cross sectional area A2 at the narrowest point of the saliva channel.

2. The suction hand piece according to claim 1, wherein the ratio m=A1/A2 has a value between 3 and 100.

3. The suction handpiece according to claim 2, wherein the ratio m has a value between 5 and 50.

4. The suction hand piece according to claim 3, wherein the cross sectional area A1 has a value between 25 mm$^2$ and 120 mm$^2$, and the cross sectional area A2 has a value between 1.7 mm$^2$ and 8 mm$^2$.

5. The suction hand piece according to claim 4, wherein the cross sectional area A1 has a value between 35 mm$^2$ and 100 mm$^2$, and the cross sectional area A2 has a value between 2.5 mm$^2$ and 8 mm$^2$.

6. The suction hand piece according to claim 4, wherein the cross sectional area A1 and A2 are circular.

7. The suction handpiece according to claim 1, wherein the negative pressure channel and the atomized spray channel each extend in a straight line and have longitudinal axes aligned with one another.

8. The suction handpiece according to claim 7, wherein the saliva channel has an inclined portion having a longitudinal axis, which is pointing to the branching section, and wherein the longitudinal axis of the saliva channel has an angle to the longitudinal axis of the negative pressure channel which is between 10° and 45°.

9. The suction handpiece according to claim 8, wherein the angle is between 20° and 30°.

10. The suction handpiece according to claim 7, wherein the saliva channel has another section having a longitudinal axis which extends parallel to the longitudinal axis of the atomized spray channel.

11. The suction handpiece according to claim 1, wherein the atomized spray channel has a tapering section directly adjacent to the branching section, and wherein the tapering section has a cross sectional area that is tapered relative to adjacent sections of the atomized spray channel.

12. The suction handpiece according to claim 11, wherein a tapering relative to a section opposite to the branching section is 20% to 35%.

13. The suction handpiece according to claim 1, wherein a cross sectional area of the saliva channel is continuously or stepwise tapered towards the saliva connection.

14. A suction device comprising: the suction handpiece according to claim 1, a saliva suction cannula connected with the saliva connection, and an atomized spray suction cannula connected with the atomized spray connection.

15. The suction device according to claim 14, wherein the saliva suction cannula is plastically bendable and the atomized spray suction cannula is provided with at least one pivotal joint or ball-and-socket joint.

16. The suction device according to claim 14, wherein at least one of the cannulas is detachably connected with the handpiece.

17. The suction device according to claim 14, wherein the saliva suction cannula and the atomized spray suction cannula are formed in such a manner that during treatment a suction end of the saliva suction cannula can be placed in the oral cavity of a patient and one suction end of the atomized spray suction cannula can be placed outside the oral cavity of the patient.

18. The suction device according to claim 14, wherein the atomized spray suction cannula has a suction head fitted in a replaceable manner.

19. The suction device according to claim 14, wherein the saliva suction cannula is provided with a protective cap at the end which has several openings to suck in liquids.

20. The suction device according to claim 14, wherein the atomized spray suction cannula is open at an end and passes into a collecting hopper which, due to its dimensions, cannot be placed in the oral cavity of a patient.

21. The suction device according to claim 20, wherein the collecting hopper has a cross sectional are which is larger than 15 cm$^2$.

22. A suction device for a dental treatment unit comprising a saliva suction cannula, an atomized spray suction cannula, and a suction handpiece comprising a negative pressure connection which is configured to be connected with a negative pressure source of the treatment unit, a saliva connection which is connected with the saliva suction cannula, an atomized spray connection which is connected with the atomized spray suction cannula, and a branched flow path, which connects the negative pressure connection both with the saliva connection and with the atomized spray connection, wherein the flow path includes a branching section on which a negative pressure channel ending on the negative pressure connection divides into a saliva channel ending on the saliva connection and an atomized spray channel ending on the atomized spray connection, wherein the saliva suction cannula comprises a protective cap at its end having several openings for sucking in liquids, and the atomized spray suction cannula is open at its end.

23. The suction device according to claim 22, wherein the atomized spray suction cannula at its end passes into a collecting hopper which, due to its dimensions, cannot be placed in the oral cavity of a patient.

24. The suction device according to claim 23, wherein the collecting hopper has a cross sectional area which is larger than 15 cm$^2$.

* * * * *